(12) United States Patent
Liang

(10) Patent No.: US 7,665,962 B1
(45) Date of Patent: Feb. 23, 2010

(54) SEGMENTED RING FOR AN INDUSTRIAL GAS TURBINE

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 359 days.

(21) Appl. No.: 11/698,378

(22) Filed: Jan. 26, 2007

(51) Int. Cl.
*F01D 5/08* (2006.01)

(52) U.S. Cl. ............... 415/173.1; 415/115; 415/116; 416/97 R

(58) Field of Classification Search .......... 415/115, 415/116, 173.1; 416/97 R, 97 A
See application file for complete search history.

(56) References Cited

U.S. PATENT DOCUMENTS

| | | | |
|---|---|---|---|
| 3,728,039 A * | 4/1973 | Plemmons et al. | 415/115 |
| 4,222,707 A * | 9/1980 | Drouet et al. | 415/116 |
| 4,573,865 A | 3/1986 | Hsia et al. | |
| 4,679,981 A | 7/1987 | Guibert et al. | |
| 5,048,288 A * | 9/1991 | Bessette et al. | 60/226.1 |
| 5,375,973 A | 12/1994 | Sloop et al. | |
| 5,423,659 A | 6/1995 | Thompson | |
| 5,480,281 A * | 1/1996 | Correia | 415/115 |
| 5,601,402 A | 2/1997 | Wakeman et al. | |
| 5,772,400 A | 6/1998 | Pellow | |
| 5,964,575 A | 10/1999 | Marey | |
| 5,993,150 A * | 11/1999 | Liotta et al. | 415/115 |
| 6,126,389 A | 10/2000 | Burdgick | |
| 6,146,091 A * | 11/2000 | Watanabe et al. | 415/115 |
| 6,368,054 B1 * | 4/2002 | Lucas | 415/135 |
| 6,508,623 B1 | 1/2003 | Shiozaki et al. | |
| 6,659,716 B1 | 12/2003 | Laurello et al. | |
| 6,666,645 B1 | 12/2003 | Arilla et al. | |
| 6,726,446 B2 | 4/2004 | Arilla et al. | |
| 6,877,952 B2 | 4/2005 | Wilson | |
| 6,899,518 B2 | 5/2005 | Lucas et al. | |
| 7,063,503 B2 * | 6/2006 | Meisels | 415/116 |

\* cited by examiner

*Primary Examiner*—Igor Kershteyn
(74) *Attorney, Agent, or Firm*—John Ryznic

(57) ABSTRACT

A blade outer air seal in a gas turbine engine, the BOAS includes a plurality of ring segments secured to a blade ring carrier. An impingement ring forms a pressure vessel within the blade ring carrier and includes a first group of impingement holes positioned over the middle of the blade tip. The ring segments each include a plurality of stiffener ribs forming a plurality of leading edge pockets, trailing edge pocket and middle pockets each with pin fins to enhance the heat transfer effect. A metering plate is secured over the stiffener ribs to form closed pockets over the edge pockets while leaving the middle pockets open. A second group of impingement holes are formed in the metering plate over the edge pockets. Pressurized cooling air supplied to the pressure vessel first passes through the first group of impingement holes and is discharged directly over the middle pockets. The cooling air then flows through the second group of impingement holes and into the closed edge pockets, and then out discharge holes arranged along the leading and trailing edges of the ring segment. The individual pockets can have the impingement holes of varying sizes in order to regulate the amount of cooling air that flows into the specific pocket.

23 Claims, 2 Drawing Sheets

SEGMENTED RING FOR AN INDUSTRIAL GAS TURBINE

CROSS-REFERENCE TO RELATED APPLICATIONS

This application is related to a co-pending U.S. patent application Ser. No. 11/698,379 (entitled BOAS with multi-metering diffusion cooling).

BACKGROUND OF THE INVENTION

1. Field of the Invention

The present invention relates generally to a gas turbine engine, and more specifically to a blade outer air seal and its cooling.

2. Description of the Related Art Including Information Disclosed Under 37 CFR 1.97 and 1.98

In an axial flow gas turbine engine, a compressor provides compressed air to a combustor where a fuel is mixed with the compressed air to produce an extremely high temperature gas flow. The resulting hot gas flow is then passed through a multiple stage turbine to produce power that drives the turbine rotor shaft. In an aero engine used to power an aircraft, the turbine is used mainly to drive the compressor and an optional fan blade to propel the aircraft. In an industrial gas turbine engine, as much of the hot gas flow is used to drive the turbine in order to convert as much of the chemical energy from the combustion into mechanical work that is used to drive an electric generator.

The turbine section of the engine includes a plurality of stages of rotor blades that convert the hot gas flow into mechanical energy that drives the turbine shaft. The rotor blades rotate within the engine and form a gap between the blade tip and an outer shroud on the engine casing. The blade tip gap will allow for hot gas flow to leak through the turbine, and therefore a loss of energy is produced. The blade tip gap will change depending upon the outer shroud and blade temperatures. Limiting the gap space such that a hot gas flow leakage is minimized will improve the efficiency of the engine.

In the prior art, blade outer air seals (or, BOAS) have been proposed to limit the blade tip gap formed between the blade tip and the outer shroud. The outer shroud seal is formed from a plurality of arcuate shroud segments forming an annular arranged on the stator assembly that encircles the rotor blades. Thermal barrier coatings (TBC) have also been added to the shroud segment surfaces to limit thermal damage to the BOAS since the hot gas flow leakage will affect the blade tip and the shroud segment material.

One problem found with arcuate shroud segments that have a TBC applied thereto is the stresses developed between the TBC and the substrate on which the TBC is applied. When the engine is cold, no stress is developed between the TBC and the substrate of the arcuate shroud segment because the TBC was applied in the cold condition. When the engine is operating and the shroud segments reach normal operating temperatures, the shroud segments tend to bend due to thermal growth. Mismatch between the coefficients of thermal expansion between the TBC and the shroud segment will induce high stresses between the materials and cause spalling of the TBC.

One prior art reference that attempts to address this problem is U.S. Pat. No. 5,375,973 issued to Sloop et al on Dec. 27, 1994 entitled TURBINE BLADE OUTER AIR SEAL WITH OPTIMIZED COOLING in which the BOAS shroud segment includes first and second groups of cooling passages each with a cooling air supply orifice to supply cooling air from the casing cavity, one or more re-supply holes connecting the cooling passages to the cavity to re-supply cooling air, and cross supply orifices connecting adjacent cooling passages to provide for cross flow of cooling air between the cooling passages in the event that the flow within a particular passage shroud decrease, as in the case where the metering orifice of a cooling passage is partially obstructed by a foreign object (see column 6, lines 25-34 in the Sloop et al patent). The Sloop et al patent provides improved BOAS cooling over the cited prior art. However, the present invention improves over the Sloop et al cooling design by providing for multi-metering diffusion compartment cooling to provide improved cooling using less cooling air.

An object of the present invention is to provide for a ring segment cooling design which utilizes near wall multi-impingement cooling for the entire blade outer air seal in order to improve the durability of the thermal barrier coating.

Another objective of the present invention is to provide the near-wall multi-impingement cooling with a backside grid thin panel construction of the ring segment to further improve the durability of the thermal barrier coating.

BRIEF SUMMARY OF THE INVENTION

The present invention is blade outer air seal assembly with a ring segment having near-wall multi-impingement cooling of the BOAS to improve the durability of the TBC. A first impingement plate is secured to the blade ring carrier and forms a first impingement cavity connected to a source of pressurized cooling air. The first impingement cavity controls the total amount of cooling and leakage flow for the BOAS. The first impingement plate includes a first impingement hole group that directs all of the impingement cooling air onto the backside of ring segment backing substrate formed over the center of the blade tip which is the hottest part of the blade tip. Stiffener ribs separate the ring segment into a grid forming multiple impingement pockets. A second metering plate is secured on the ribs to form closed impingement pockets formed outside from the central pockets. Pin fins extend from the ring carrier floor upward into the pockets to aid in the heat transfer rate to the cooling air. The pockets formed on the sides of the ring carrier are connected to metering diffusion slots on the leading edge side and exit holes on the trailing edge side to discharge the cooling air out from the BOAS.

DETAILED DESCRIPTION OF THE INVENTION

Figure 1:
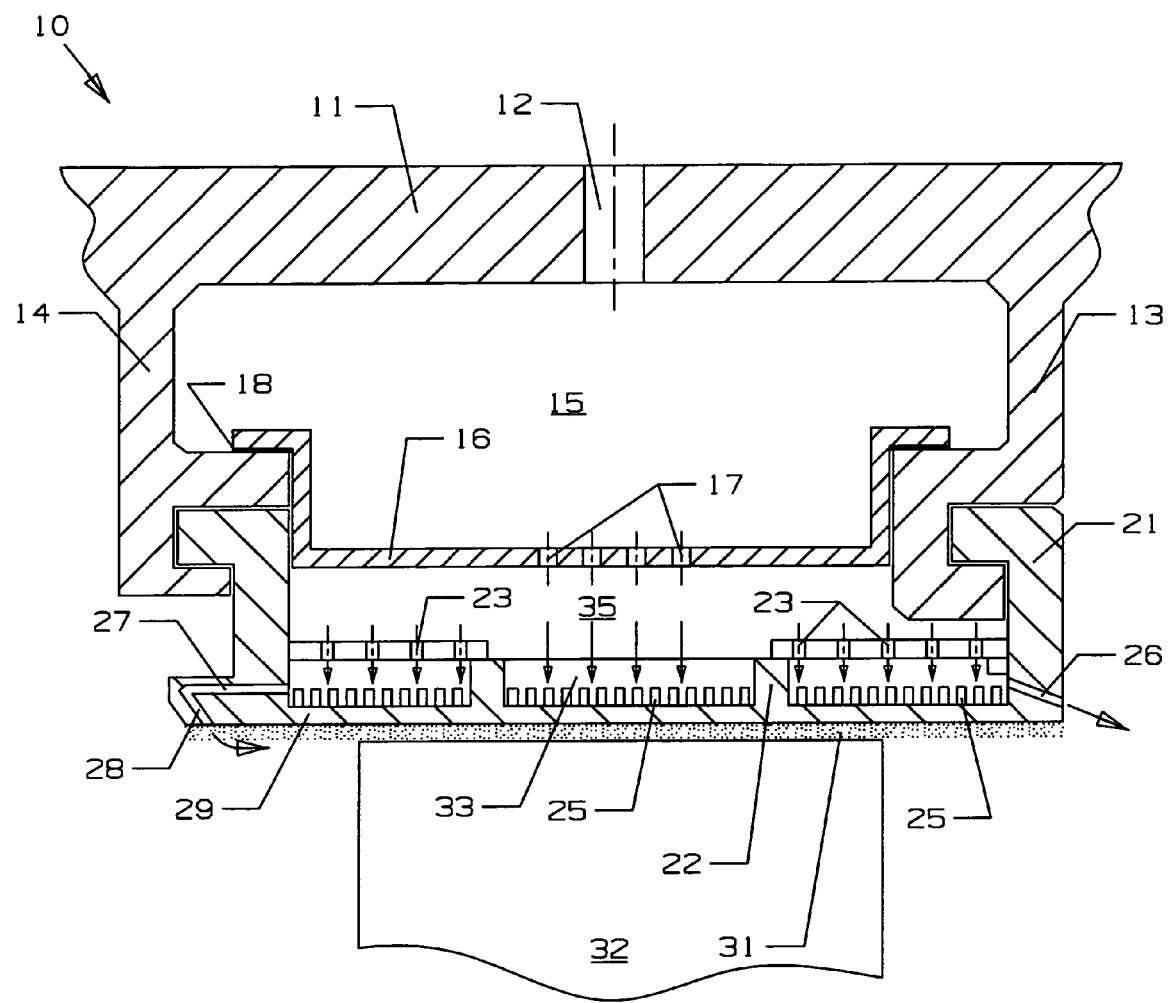
FIG. 1 shows a cross sectional view of the near wall ring segment cooling design of the present invention.
Figure 2:
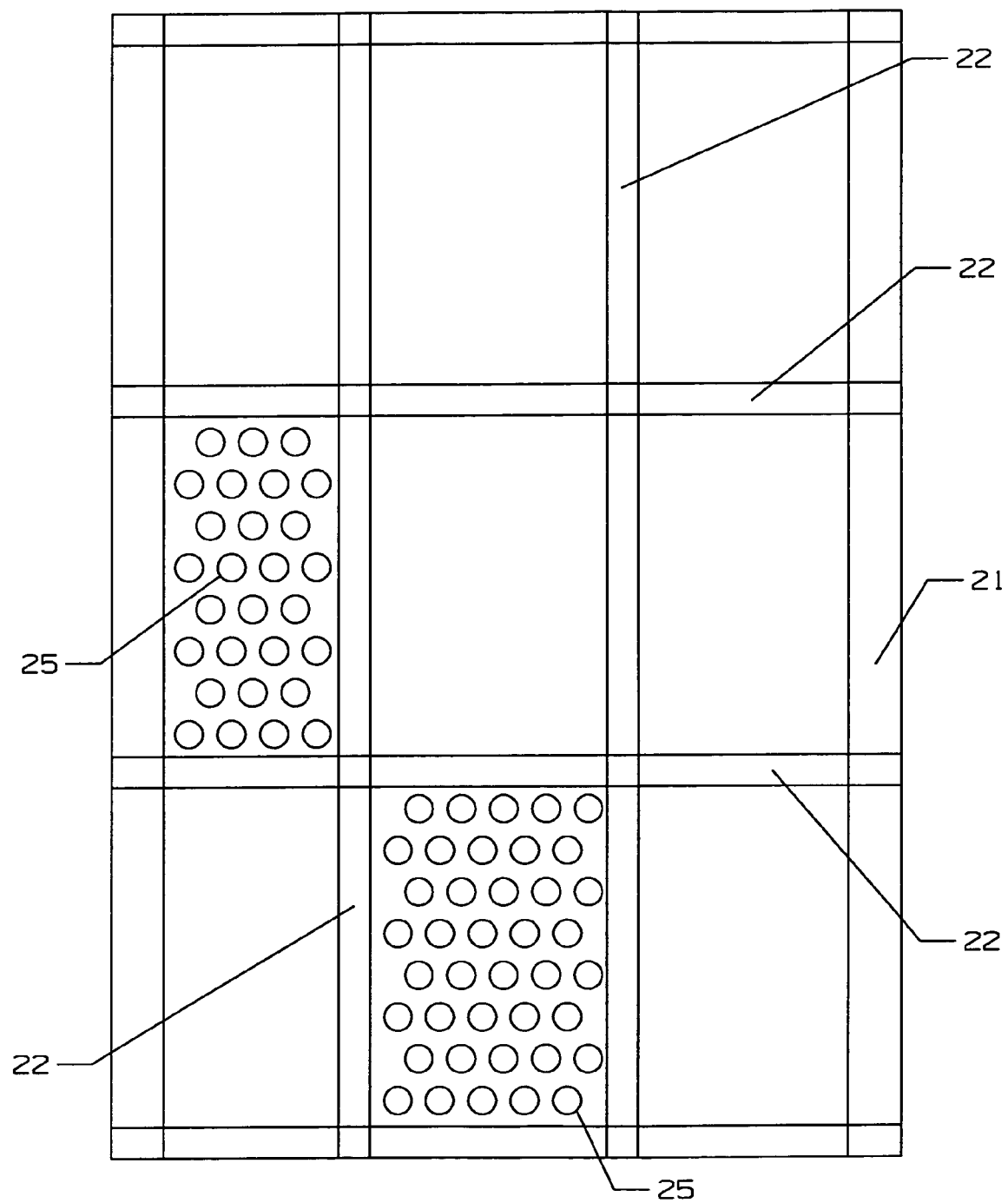
FIG. 2 shows a top view of the ring segment of the present invention.

The ring segment with the near-wall multi-impingement cooling arrangement of the present invention is shown in FIG. 1. A blade ring carrier 11 includes one or more cooling air feed holes 12 connected to a source of pressurized cooling air such as the compressor of a gas turbine engine to supply cooling air to the BOAS. The carrier ring 11 includes leading edge and trailing edge hooks 14 and 13 in which the ring segment 21 is secured. An impingement ring 16 is secured to the blade ring carrier 11 to form a pressure vessel 15 by a weld 18 or any other well known attachment method. The impingement ring 16 includes a first group of impingement holes 17 positioned in the middle of the impingement ring 16 to be directly over the middle of the blade tip. At this location on the middle of the blade tip, the hottest gas flow passes over the BOAS. The first impingement cavity (pressure vessel) 15 controls the total amount of cooling and leakage flow for the BOAS. The first impingement cooling cavity or pressure vessel 15 also produces a reduction in the cooling air pressure which results in lowering the leakage flow through the ring segment peripheral gap and attachment hooks.

The ring segment 21 includes leading edge and trailing edge hooks that secure the ring segment 21 to the blade ring carrier 11. The ring segment 21 includes a floor 29 with stiffener ribs 22 extending upward in a grid arrangement to form pockets 33 formed between the stiffener ribs 22. The floor 29 has an outer surface on which a thermal barrier coating 31 is applied. The floor 29 of the pockets 33 in the ring segment 21 includes pin fins 25 extending upward to enhance the overall convection capability from the metal to the cooling air. The pin fins 25 have a diameter of about 0.1 inches and a height of about 0.1 inches and arranged at a density pattern of greater than 50%. The height of the pin fins 25 is about equal to the thickness of the ring carrier floor 29 in order to provide the highest heat transfer rate from the outer surface of the BOAS to the cooling air. Also, the stiffener ribs have a height of at least four times the diameter of the second impingement holes 23 in order to maximize the impingement cooling effect of the closed pockets 33 with the second impingement cooling holes 23. The pin fins are formed in the ring carrier floors by EDM machining instead of a casting process for the ring carrier in order to form cylindrical shaped pin fins.

A second metering plate having a second group of impingement holes 23 is secured to the stiffener ribs on the ring carrier to enclose the pockets 33. The second set of impingement holes 23 are of various sizes and number depending upon which pocket is being cooled by the holes. The second impingement holes 23 have a smaller diameter than the first impingement holes 17. Pockets that are exposed to higher temperatures are cooled with more impingement cooling air, while pockets exposed to lower temperatures require less impingement cooling air. Selectively varying the amount of impingement cooling air delivered to the pockets allows for less cooling air to be used, and therefore improves the efficiency of the engine.

The ring carrier 21 includes a plurality of metering and diffusion slots 27 and 28 on the leading edge, and a plurality of exit holes 26 on the trailing edge to discharge the cooling air from the respective pockets 33. The hole 28 on the leading edge is angled toward the BOAS to direct the discharged cooling air toward the blade 32 and gap. A layer of thermal barrier coating 31 is applied to the underside of the ring carrier 21.

In operation, cooling air is supplied through one or more air feed holes 12 the blade ring carrier 11 and into the pressure vessel 15. The cooling air in the pressure vessel 15 is then metered through the first impingement ring 16 to provide first impingement cooling to the backside of the ring segment over the middle pockets that extend along the circumference of the ring segment 21. The amount of cooling air for each individual circumferential impingement pocket 33 is sized based on the local gas side heat load and pressure, thus regulating the local cooling performance and metal temperature. The spent cooling air is then metered through the second impingement plate with second impingement cooling holes 23 and into the pockets 33 for cooling the forward and aft section of the ring segment prior to discharge through the metering and diffusion slots 27 and 28 at the leading edge of the ring segment as well as exit holes 26 on the trailing edge and mate-face of the ring segment.

The cooling circuit of the present invention maximizes the usage of cooling air for a given ring segment inlet gas temperature and pressure profile. In addition, cooling air is metered twice in each individual impingement compartment, allowing the cooling air to generate a maximum backside convective cooling potential and achieves a uniform cooling for the ring segment. The cooling design controls the amount of cooling air to be discharged at various locations of the ring segment. Because the ring segment floor thickness is relatively thin, higher heat transfer rates are obtainable. Because of the criss-cross pattern of the stiffener ribs, flexing or bending of the ring segment due to thermal loads is minimized and the ring segments are rigid. Because the pin fins have about the same height as the ring segment floor thickness, the heat transfer rate is maximized from the metal to the cooling air. This allows for impingement cooling being closer to the hot surface of the BOAS. Also, because of the first impingement plate with the larger diameter impingement holes, all of the cooling air flows into the middle pockets to provide a high level of impingement cooling for the hottest section of the BOAS. The spent cooling air is finally discharged from the ring segment. Optimum cooling flow utilization is achieved with the ring segment cooling design of the present invention.

I claim:

1. A blade outer air seal for a gas turbine engine comprising:
    a blade ring carrier having a cooling air feed hole to supply cooling air to a blade ring air seal;
    a ring segment held in place by the blade ring carrier and forming the blade outer air seal with a tip of a turbine blade;
    the ring segment having a plurality of pockets formed by stiffener ribs and including at least one leading edge pocket, at least one middle pocket, and at least one trailing edge pocket;
    a metering plate secured to the stiffener ribs and forming closed pockets on leading and trailing edges and forming an open pocket on the middle pocket;
    an impingement ring secured between the cooling air feed hole and the metering plate, the impingement ring having a first group of impingement holes positioned over the middle pocket; and,
    the metering plate including a plurality of second groups of impingement holes positioned over the edge pockets.

2. The blade outer air seal of claim 1, and further comprising:
    the leading edge and trailing edge pockets and the middle pocket include pin fins extending from a floor of the pocket to enhance the backside convection of the pockets.

3. The blade outer air seal of claim 2, and further comprising:
    the pins fins each have a diameter of around 0.1 inches and a height of around 0.1 inches.

4. The blade outer air seal of claim 2, and further comprising:
    the pins fins have a density pattern of greater than 50%.

5. The blade outer air seal of claim 2, and further comprising:
    the pin fins have a height substantially equal to the floor thickness of the ring carrier.

6. The blade outer air seal of claim 1, and further comprising:
    a height of the stiffener ribs is around four times the diameter of the second group of impingement holes.

7. The blade outer air seal of claim 6, and further comprising:
a plurality of impingement pockets formed by the stiffener ribs, the pockets each including pin fins to enhance the heat transfer rate from the metal to the cooling air; and,
the pin fins have a height substantially equal to the floor thickness of the ring carrier.

8. The blade outer air seal of claim 1, and further comprising:
the floor of the pockets in the ring segment is a thin wall;
pin fins extend from the floor wall in each of the pockets; and,
the height of the pin fins is substantially equal to the thickness of the floor of the ring carrier.

9. The blade outer air seal of claim 1, and further comprising:
at least one metering and diffusion slot arranged along the leading edge side of the ring segment and in fluid communication with the leading edge pocket to discharge the cooling air from the pocket into the hot gas flow.

10. The blade outer air seal of claim 9, and further comprising:
at least one exit hole arranged along the trailing edge side of the ring segment and in fluid communication with the trailing edge pocket to discharge the cooling air from the pocket.

11. The blade outer air seal of claim 2, and further comprising:
the middle pocket is located over the middle of the blade tip where the hottest gas flow leakage occurs.

12. The blade outer air seal of claim 2, and further comprising:
a plurality of the pockets forming a grid of pockets extending in both the leading to trailing edge direction and the circumferential direction of the ring segment.

13. The blade outer air seal of claim 12, and further comprising:
the impingement holes in the metering plate are varying in size from pocket to pocket to vary the impingement cooling over the ring segment.

14. The blade outer air seal of claim 2, and further comprising:
the first group of impingement holes in the impingement ring is positioned directly over the middle pocket to provide impingement cooling in the middle pocket.

15. A process for cooling a blade outer air ring of a gas turbine engine comprising the steps of:
feeding pressurized cooling air into a pressure vessel of a blade ring carrier;
metering cooling air from the pressure vessel through a first group of impingement holes positioned over a center pocket of the blade outer air seal ring segment;
re-directing the impingement air from a middle pocket through a plurality of second impingement holes into pockets on the leading edge and trailing edge sides of the ring segment; and,
discharging the cooling air from the edge pockets through holes in the ring segment.

16. The process for cooling a blade outer air ring of claim 15, and further comprising the step of:
varying the impingement cooling air flow through the second impingement holes to vary the amount of cooling in the pockets.

17. The process for cooling a blade outer air ring of claim 15, and further comprising the step of:
discharging the cooling air from the leading edge pocket through a plurality of metering and diffusion slots in a direction toward the blade tip.

18. A blade outer air seal ring segment for use in a gas turbine engine, the ring segment comprising:
the ring segment having hooks to secure the ring segment to a blade ring carrier;
a floor with an outer surface for application of a thermal barrier coating;
a plurality of stiffener ribs forming impingement pockets;
each pocket having a plurality of pin fins extending from the floor;
a height of the pin fins is substantially equal to a thickness of the thin wall floor;
the stiffener ribs form a plurality of middle pockets located over the hottest portion of a blade tip in the engine;
the stiffener ribs form a plurality of leading edge pockets and a plurality of trailing edge pockets;
a metering plate secured to the stiffener ribs, the metering plate having an opening above the middle pockets such that the middle pockets are not metered with cooling air; and,
the metering plate enclosing the leading and trailing edge pockets and having a plurality of impingement holes over the edge pockets.

19. The blade outer air seal ring segment of claim 18, and further comprising:
The height of the stiffener ribs is at least four times the diameter of the impingement holes.

20. The blade outer air seal ring segment of claim 18, and further comprising:
The leading edge pockets each include at least one metering and diffusion cooling hole to discharge cooling air from the leading edge pocket; and,
The trailing edge pockets each include at least one exit cooling hole to discharge the cooling air from the trailing edge pocket.

21. The blade outer air seal ring segment of claim 18, and further comprising:
A thermal barrier coating applied to the outer surface of the ring segment floor.

22. The blade outer air seal ring segment of claim 18, and further comprising:
The pin fins have a diameter of about 0.1 inches and a height of about 0.1 inches.

23. The blade outer air seal ring segment of claim 18, and further comprising:
the LE pockets and the TE pockets and the middle pockets are without film cooling holes that discharge onto an inner surface of the BOAS.

* * * * *